US008953565B1

(12) United States Patent
Schlesener et al.

(10) Patent No.: US 8,953,565 B1
(45) Date of Patent: Feb. 10, 2015

(54) PROVIDING ADAPTIVE NETWORK ACCESS

(75) Inventors: Matthew Carl Schlesener, Kansas City, MO (US); Ahsan Habib, Olathe, KS (US); Pallavur Ananthakrishnan Sankaranaraynan, Overland Park, KS (US); Lyle Walter Paczkowski, Mission Hills, KS (US); Brian Douglas Mauer, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1089 days.

(21) Appl. No.: 11/627,675

(22) Filed: Jan. 26, 2007

(51) Int. Cl.
  *H04W 4/00* (2009.01)
  *H04L 12/28* (2006.01)
  *H04B 7/15* (2006.01)
  *H04B 7/00* (2006.01)

(52) U.S. Cl.
  USPC .......... 370/338; 370/238; 455/11.1; 455/41.2

(58) Field of Classification Search
  CPC ......... H04L 45/02; H04L 45/08; H04L 45/12; H04L 45/121; H04L 45/123; H04L 45/124; H04L 45/22; H04L 45/28; H04L 45/30; H04L 45/48; H04L 67/327; H04L 64/104; H04W 40/00; H04W 40/02; H04W 40/22; H04W 40/24; H04W 40/34; H04W 76/023; H04W 88/04; H04W 88/06
  USPC ............... 455/11.1, 41.2, 421, 423, 424, 425, 455/435, 445, 453, 456.1, 7, 16; 370/315, 370/338, 238, 351
  See application file for complete search history.

(56) References Cited

U.S. PATENT DOCUMENTS

| 2002/0122410 | A1* | 9/2002 | Kulikov et al. ............... 370/349 |
| 2003/0202468 | A1* | 10/2003 | Cain et al. ..................... 370/229 |
| 2004/0008691 | A1* | 1/2004 | Winter et al. ............ 370/395.31 |
| 2005/0037789 | A1* | 2/2005 | Rhee et al. ..................... 455/507 |
| 2005/0148315 | A1* | 7/2005 | Sawada ......................... 455/403 |
| 2006/0002332 | A1* | 1/2006 | Diaz Cervera et al. ........ 370/328 |
| 2008/0188177 | A1* | 8/2008 | Tan et al. ..................... 455/11.1 |

OTHER PUBLICATIONS

Gopal Dommety et al. "Flat Location Management Scheme for PCNs," Proc. of IEEE ICUPC'97, San Diego, Oct. 12-16, 1997.
Thomas F. La Porta et al., "Comparison of Signaling Loads for PCS Systems," IEEE/ACM Transactions on Networking, 4(6): 840-856 (Dec. 1996).

(Continued)

*Primary Examiner* — Michael Mapa

(57) ABSTRACT

A method, system, and medium are provided for adaptively providing network access to mobile devices. The mobile devices have a first interface for a wireless access network and a second interface for a personal area network. The wireless access network connects the mobile devices to a base station, and the personal area network connects the mobile device to other mobile devices that are part of the personal area network. Wireless access conditions are generated by the base station and communicated over the wireless access network to mobile devices that generate network access requests. Additionally, the mobile devices may transmit the wireless access conditions over the personal are network to other mobile devices that are within a predetermined distance. The mobile devices detect that the wireless access conditions in the wireless access network have degraded and adaptively select alternate routes to complete the network access requests.

20 Claims, 4 Drawing Sheets

(56) References Cited

OTHER PUBLICATIONS

Guo-Hui Li et al., "Location Management in Cellular Mobile Computing Systems with Dynamic Hierarchical Location Databases." Journal of Systems and Software, 69(1-2): 159-171 (2004).

Kun Park II et al., "Reducing Registration Traffic for Multi-Tier Personal Communications Services," IEEE Transactions on Vehicular Technology, 46(3): 597-602 (Aug. 1997).

* cited by examiner

PROVIDING ADAPTIVE NETWORK ACCESS

INTRODUCTION

Conventional mobile phones complete voice communications over a conventional wireless network. The conventional wireless network includes a database that tracks a location of mobile phones that are provisioned communication channels in response to the mobile phones attempt to initiate a voice communication. The conventional wireless network may utilize the database to register the conventional mobile phones and store a current location associated with each conventional mobile phone.

A base station associated with one or more areas in the conventional wireless network detects weak signal strength generated by antennas associated with the one or more areas. The conventional mobile phones that, are located in, or move to the one or more areas having weak signal strength may continuously attempt to acquire communication channels from the base station when the conventional mobile phones initiate a voice communication. When initiating a voice communication, the conventional mobile phones attempt to register with the conventional wireless network. Because of the weak signal strength, the conventional mobile phones continuously register or deregister with the base station in the conventional wireless network. The continuous registering and deregistering of the conventional mobile phones results in congestion due to the number of mobile phones continuously communicating over the conventional wireless network. Moreover, congestion in the conventional wireless network is increased during a disaster that renders one or more antennas or base stations inoperable; because each of the conventional mobile devices that communicates in the conventional wireless network overloads the conventional wireless network with requests to initiate voice communications.

SUMMARY

The present invention is defined by the claims below. Embodiments of the present invention solve at least the above problems by providing a medium, system and method for, among other things, adaptively provisioning wireless access. The present invention has several practical applications in the technical arts including reducing congestion in a wireless access network having weak signal strength, sharing wireless access conditions among neighboring mobile devices, and adaptively selecting access routes based on wireless access conditions in a wireless access network.

In a first aspect, a set of computer-useable instructions provide mobile devices with the ability to adaptively access a first wireless access network when completing a network access request. The mobile devices receive wireless access conditions and utilize the wireless access conditions to generate wireless access messages. The wireless access messages provide an indication of whether the network access request can be completed over the first wireless access network. Based on the wireless access conditions, the wireless access messages may include suggested alternate routes for completing the network access request.

In a second aspect, the mobile devices receive wireless access conditions and assign weights to each wireless access condition based on at least a type or magnitude of the wireless access condition and a number of mobile devices that delivered similar wireless access conditions. The weights and wireless access condition are stored in a database that is utilized to generate the wireless access messages. The wireless access messages are dynamically updated when wireless access conditions associated with the wireless access network improves or degrades.

In a third aspect, a wireless communication system provides one or more mobile devices that adaptively access a wireless access network when completing network access requests. The wireless communication system includes one or more mobile devices, a database, and an adaptive access engine. The one or more mobile devices include a first interface for a wireless access network and a second interface for a personal area network. The database stores wireless access conditions associated with the wireless access network. The mobile devices may share wireless access conditions with other mobile devices over the second interface. The adaptive access engine process the wireless access conditions and generates wireless access messages. Moreover, the adaptive access engine selects alternate routes included in the wireless access messages based on the wireless access condition to complete the network access requests.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the present invention provide media, systems, and methods for an adaptive learning technique that provides the mobile devices with the ability to learn how to do tasks, such as complete network access requests, based on data, such as wireless access conditions, given for training or initial experience. For instance, the adaptive learning technique is utilized by the mobile devices to generate appropriate wireless access messages based on the wireless access conditions associated with a wireless access network. The mobile devices may learn how to react to wireless access conditions, such as low signal strength. Furthermore, the adaptive learning technique may utilize processing elements within each mobile device to perform pattern recognition when generating wireless access messages. Also, each mobile device within a predetermined distance may utilize a feed-forward algorithm to share the wireless access messages. Therefore, each mobile device may utilize the adaptive learning technique to implement pattern recognition and feed-forward algorithms, which generate and share wireless access messages, respectively, in response to wireless access conditions in the wireless access network.

As utilized herein, the term "component" refers to any combination of hardware, software, and firmware. Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media. The computer readable media are non-transitory in nature and store computer-useable instructions.

Embodiments of the present invention utilize adaptive learning techniques to train mobile devices to adaptively respond to wireless access conditions. The adaptive learning techniques may trigger wireless access messages that respond to network access requests generated by the mobile devices. In some embodiments, the wireless access messages may inform the mobile devices that registration with a particular base station on a wireless access network can not be performed based on wireless access conditions or previous wireless access messages. The adaptive learning techniques may utilize the wireless access conditions to detect the availability of resources on the wireless access network and to inform the mobile devices how or when to complete the network access requests.

Figure 1:
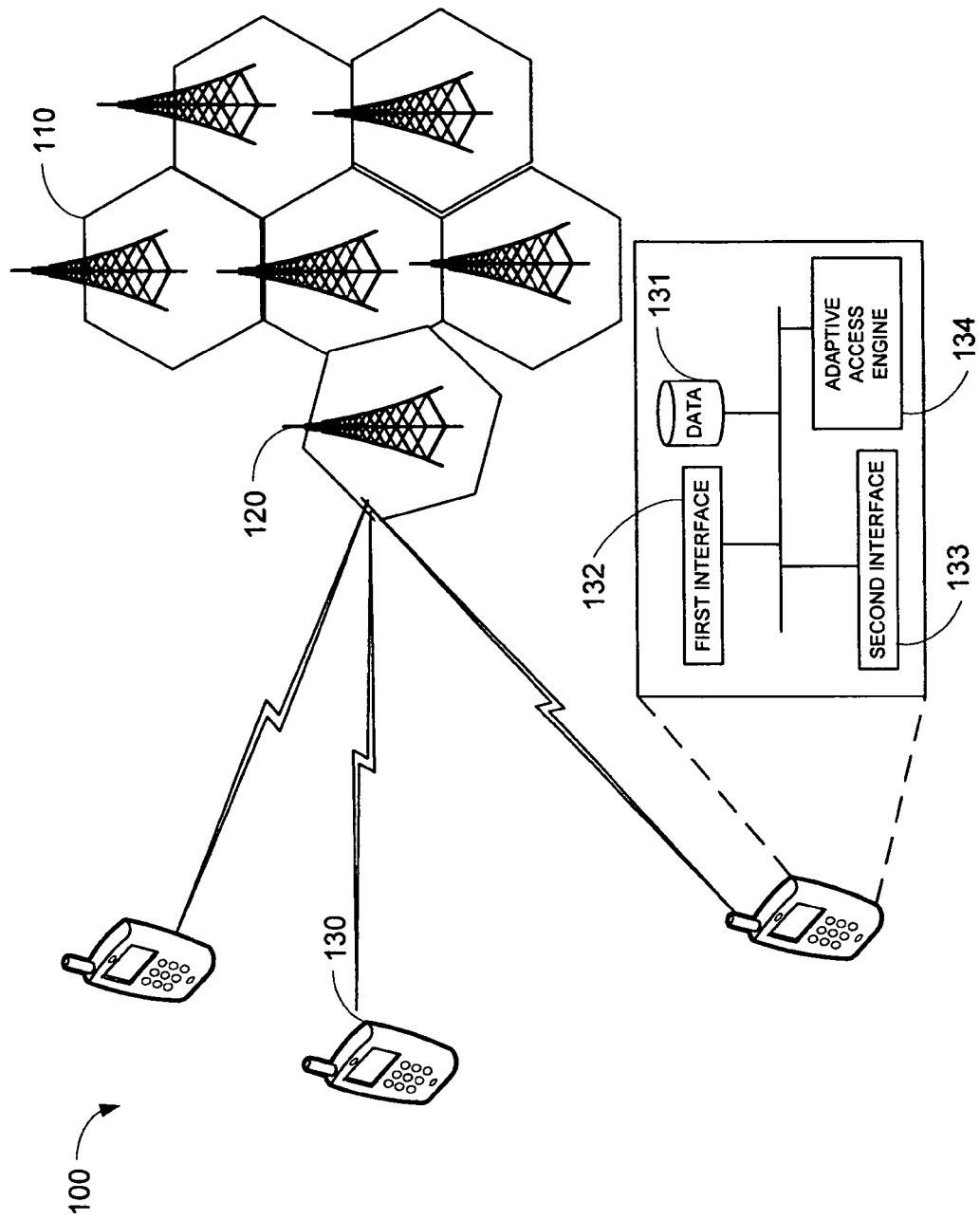
FIG. 1 is a network diagram that illustrates an exemplary operating environment, according to embodiments of the present invention.

FIG. 1 is a network diagram that illustrates an exemplary operating environment 100, according to embodiments of the present invention. The exemplary operating environment 100 includes base stations 110, antennas 120, and mobile devices 130.

The base stations 110 receive network access requests generated by the mobile devices 130. The bases stations 110 may generate wireless access conditions associated with wireless access network. The wireless access conditions may include, among other things, signal strength, capacity, and data loss. The base stations 110 may communicate the wireless access conditions, over the wireless access network, to one or more mobile devices that generated the network access request. In some embodiments, the base stations 110 may include databases that store the wireless access conditions and locations, such as global positions system (GPS) data, associated with the mobile devices.

The antennas 120 facilitate wireless communication between the mobile devices 130 and the bases stations 110. The antennas 120 are associated with one or more overlapping or nonoverlapping coverage areas. As the mobile devices 130 move among coverage areas the antennas 120 are utilized to receive communication data from the mobile devices 130, and the base stations 110 receive and further process the communication data.

The mobile devices 130 include, among other things, a database 131, a first interface 132, a second interface 133, and an adaptive access engine 134. The database 131 may store location information associated with the mobile devices, wireless access conditions associated with the wireless access network, and weights that are assigned to wireless access conditions. Also, the database 131 located on the mobile devices 130 may be configured to expire at specified intervals, such as every six hours or upon changing location or coverage areas. In an alternate embodiment, the database 131 may be configured to archive the location and wireless access conditions. Additionally, the database 130 may be archived on a remote database located at the bases station 110.

The first interface 132 is associated with the wireless access network that connects the mobile devices 130 to the base stations 110. In some embodiments, the wireless access network includes, but is not limited to, radio frequency networks or other cellular networks. The mobile devices 130 may utilize the first interface 132 to transmit network access requests and to receive the wireless access conditions from the base station 110.

The second interface 133 is associated with a personal area network that connects the mobile devices 130 within a predetermined distance to each other. In some embodiments, personal area network includes, but is not limited to, Bluetooth™, ZigBee™, Infrared, or other limited range wireless networks. In an alternate embodiment, the personal area network may include a wired network, such as a universal serial bus (USB) network or Ethernet network or other wired networks. The mobile devices within a predetermined distance utilize the second interface 133 to connect to each other and share among other things, wireless access conditions and wireless access messages. In some embodiments, the personal area network may be utilized as an alternate route for completing specified network access request. For instance, bandwidth limited network access requests such as delivering digital content or data messages are performed over the personal area network when the mobile device processes the wireless access conditions and generates wireless access messages that indicate the wireless access network is congested or unavailable. In certain embodiments, voice or video communication among mobile devices in the personal area network may be completed over the personal area network when the mobile devices determine that wireless access network is congested or unavailable. Additionally, when at least one mobile device 130 in the personal area network has a connection to the base station 120, the other mobile devices 130 may attempt to proxy voice or video communication through the at least one mobile device in the personal area network to complete transaction with mobile device that are outside the personal area network.

The adaptive access engine 134 generates the wireless access messages based on at least previous wireless access messages and current wireless access conditions. The wireless access messages provide the mobile devices 130 with an indication of alternate routes for completing one or more network access requests when the wireless access network is congested or unavailable. Further, in some embodiment, the adaptive access engine 134 dynamically selects at least one of the alternate routes included in the wireless access message to complete the one or more network access requests. Moreover, the adaptive access engine 134 may implement adaptive learning techniques that performs pattern recognition and forward-feeding algorithms when generating the wireless access messages.

One of ordinary skill in the art appreciates and understands that the exemplary operating environment 100 has been simplified and that alternate arrangement fall within the scope and spirit of the above description.

In an embodiment of the present invention, each mobile device may operate in a training mode and a selection mode. During the training mode, the adaptive access engine associated with the mobile device receives wireless access conditions and utilizes its pattern recognition to determine the wireless access conditions that are favorable for completing a network access request—such as a registration request, a purchase request, a voice communication, a video communication, or other similar data communication—over the wireless access network. During the training mode, the mobile devices collect wireless access conditions and sends the wireless condition to the adaptive access engine as input patterns. The adaptive access engine correlates the received input patterns with corresponding mobile device actions, such as connecting to base station, waiting for signal, or constant call dropping. When the mobile device is in selection mode, the access engine may recognize input patterns associated with limited device connectivity, dynamically select an alternate route, and transmit a wireless access message with suggested alternate routes to one or more mobile devices within the personal area network. When the input patterns are not recognized by the mobile device, the adaptive access engine executes a decision algorithm that determines whether to complete the network access request based on, among other things, past wireless access messages associate with other mobile devices and current wireless access conditions.

Figure 2:
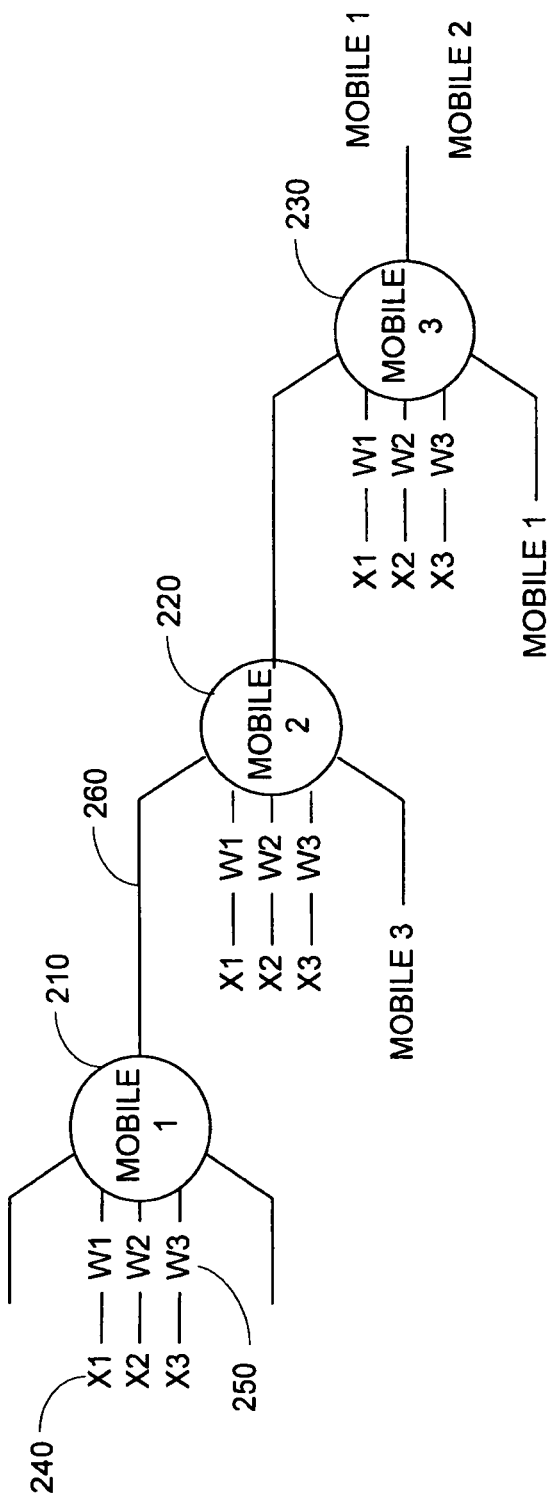
FIG. 2 is a feed-forward diagram of an adaptive learning technique utilized by mobile devices, according to embodiments of the present invention.

FIG. 2 is a feed-forward diagram of an adaptive learning technique utilized by mobile devices 210, 220, and 230, according to embodiments of the present invention. The adaptive access engine associated with each mobile device 210, 220, and 230 executes the adaptive learning technique to utilize input patterns 240 to generate output patterns 260. Furthermore, in some embodiments, the adaptive access engine assigns weights 250 to the input patterns 240 based on a type or magnitude of the input patterns 240 or a number of other mobile device that deliver similar input patterns.

The input patterns 240 are associated with wireless access conditions such as signal strength, channel bandwidth, and channel capacity. The input patterns 240 may be generated by base stations that the mobile devices 210, 220, and 230 are connected to. In some embodiments, the input patterns 240 are generated by the mobile devices 210, 220, and 230 and transmitted to other mobile devices 210, 220, and 230 within a predetermined distance. The input patterns 240 may be associated with one or more particular areas of the wireless access network and may be associated with location information that identifies the one or more particular areas.

The weights 250 are assigned to input pattern 240 based on predefined importance levels associated with the input patterns 240. For instance, an input pattern associated with signal strength may have a higher importance level than an input pattern associated with channel capacity. The weights 250 may include numerical identifiers. For instance, a weight 250 of "0" may indicate that the input pattern 240 in not very important. On the other hand, a weight 250 of "10" may indicate that the input pattern 240 is very important. In some embodiments the weight 250 assigned to the input patterns are dynamic and change based on a magnitude associated with the input patterns. For instance, an input pattern 240 associated with a low signal strength may have a weight 250 that is high to indicate the relative importance of the input pattern 240. However, when the input pattern 240 associated with the signal strength changes to a high magnitude, which indicates that the signal strength is strong and viable; the weight 250 may be altered to a low numerical identifier to indicate that the relative importance of the input pattern 240 is low.

The output patterns 260 are generated by the adaptive access engines associated with each mobile device 210, 220, and 230. In some embodiments, the output patterns 260 are wireless access messages that suggest or specify actions that complete the network access requests. The wireless access messages may indicate that the mobile device should, among other things, wait for a specified period of time, utilize an alternate route to complete the network access request, or utilize a proxy mobile device to complete the network access request. The output patterns 260 are transmitted to and utilized as input patterns 240 by neighboring mobile devices that are part of the personal area network. Accordingly, the adaptive access engines in each mobile device 210, 220, and 230 executes a forward-feeding algorithm to inform other mobile devices 210, 220, and 230 of the wireless access conditions and wireless access messages that are utilized by neighboring mobile devices 210, 220, and 230 when completing a network access request.

Embodiments of the present invention provide an adaptive access engine that utilizes pattern recognition between wireless access conditions and wireless access messages generated by each mobile device that is within a personal area network. The adaptive access engine utilizes pattern recognition to identify input patterns and associated output patterns that may complete one or more network access requests generated by the mobile devices. Further, the identified patterns are shared among mobile devices within the personal area network. Therefore, the output pattern of a first mobile is utilized as an input pattern of a second mobile device. Likewise, the output pattern of the second mobile device is utilized as an input pattern of a third mobile device. This feed-forward technique is continued until all mobile devices in the personal are network receives at least one input pattern that is associated with an output pattern of at least one different mobile device. Accordingly, when at least one mobile device in the personal area network detects a weak signal or other wireless access condition, each mobile device in the personal area network is informed of the weak signal and an associated action, such as waiting for a specified period of time, taken by the mobile device that detected the weak signal. The other mobile devices in the network that are about to initiate network access requests may hold off on issuing their network access requests until the signal strength issue is resolved or the mobile device may select alternate routes to complete their network access requests. In alternate embodiments, the adaptive access engine may be located remote from the mobile device, and the mobile devices that do not have a local adaptive access engine may proxy execution of the adaptive learning technique via one or more remote adaptive access engines.

Figure 3:
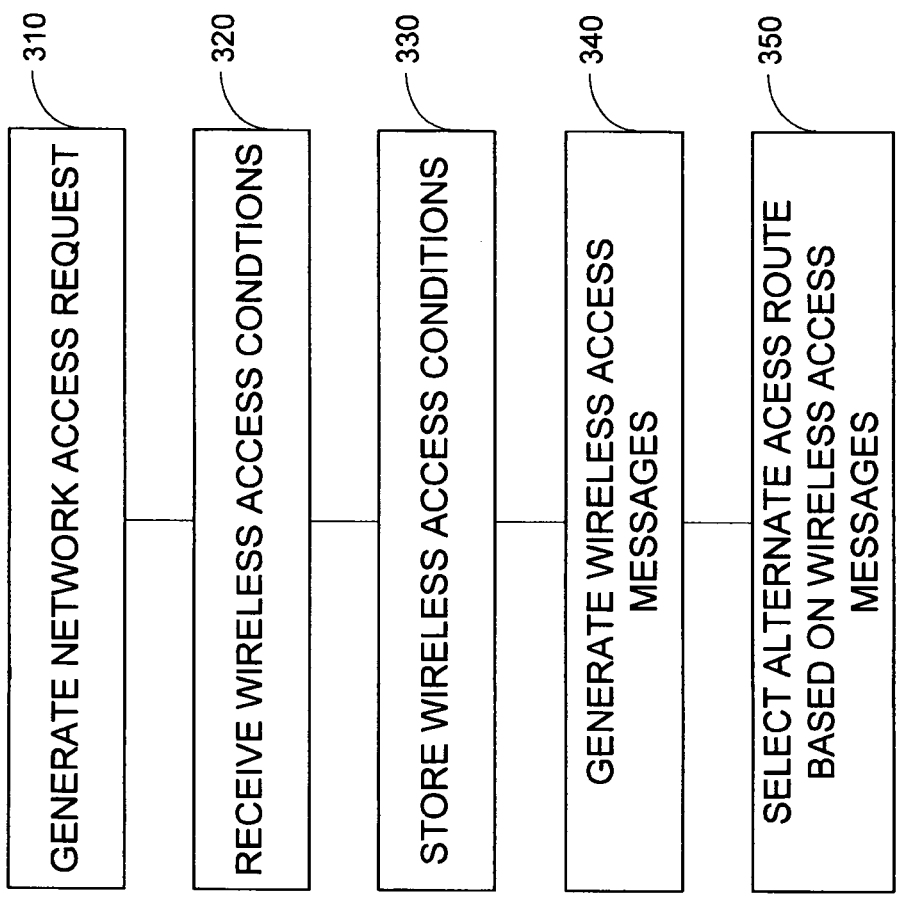
FIG. 3 is a logic diagram that illustrates a method of selecting access routes to complete network access requests, according to embodiments of the present invention.
Figure 4:
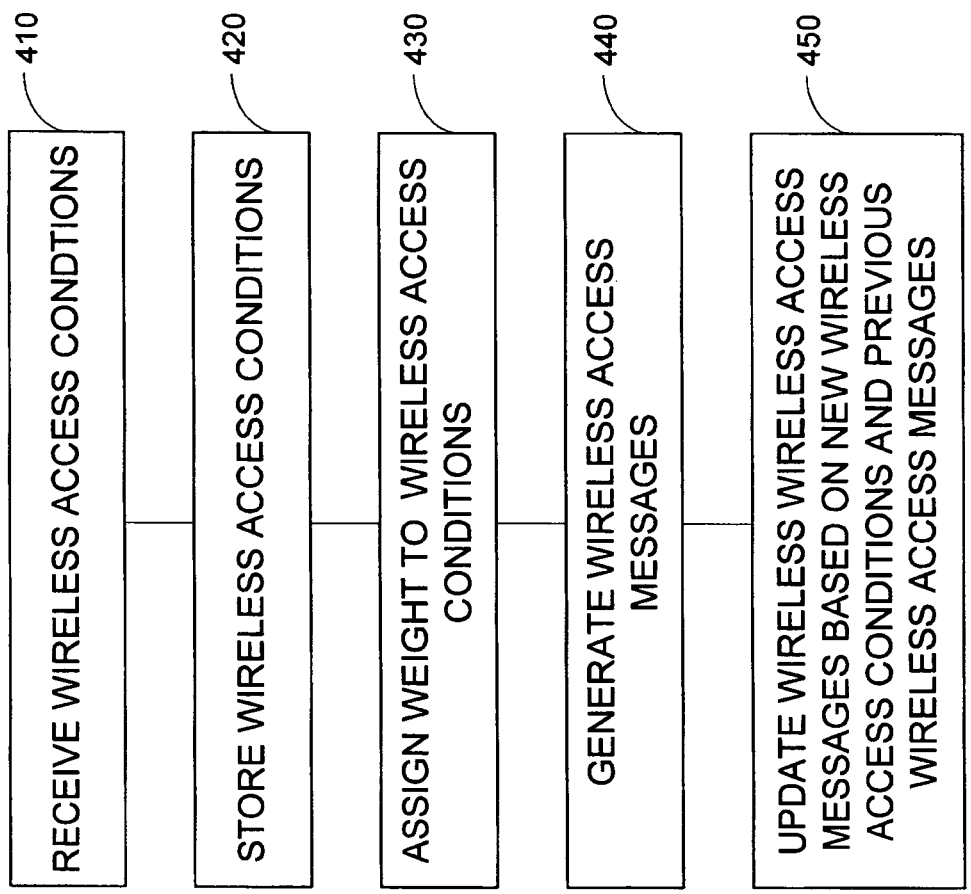
FIG. 4 is a logic diagram that illustrates a method of adaptive wireless access, according to embodiments of the present invention.

The mobile devices may utilize the adaptive access engine to adaptively access the wireless access network. Based on the type of network access requests generated and current wireless access conditions, the mobile devices may dynamically reroute the network access requests. FIGS. 3 and 4 illustrate exemplary methods that may be utilized to reroute the network access requests.

FIG. 3 is a logic diagram that illustrates a method of selecting access routes to complete network access requests, according to embodiments of the present invention. In step 310, the mobile devices generate network access requests. In step 320, wireless access conditions associated with a wireless access network are received by the mobile devices. In turn, the mobile devices store the wireless access conditions, in step 330. In step 340, an adaptive access engine associated with the mobile devices may utilize, among other things, the wireless access conditions to generate wireless access messages that provide an indication of whether the network access request can be completed over the wireless access network. In step 350, the mobile devices select an access route to complete the network access request based on, among other things, the indications included in the wireless access messages and a type associated with the network access requests.

FIG. 4 is a logic diagram that illustrates a method of adaptive wireless access, according to embodiments of the present invention. In step 410, mobile devices receive wireless access conditions associated with the wireless access network from one or more bases stations or other mobile devices within a predetermine distance and in a personal area network with the devices that received the wireless access conditions. In step 420, the mobile devices store the wireless access conditions.

In step 430, the adaptive access engines associated with mobile devices assign weights to each of the wireless access condition, based on a type or magnitude associated with the wireless access condition or a number of mobile devices that delivered similar wireless access conditions. In step 440, the adaptive access engine utilizes, among other things, the weights and the wireless access conditions to generate wireless access messages that provide an indication of whether the network access request can be completed over the wireless access network. In step 450, the adaptive access engine updates the wireless access messages based on, among other things, new wireless access conditions and previous wireless access messages.

In summary, embodiments of the present invention may provide, among other things, self-healing during disaster recovery and alternate routes for completing purchase requests, voice communications, video communication, or other data communication. During disaster recovery the distributed mobile devices share wireless access conditions to inform each mobile device that is part of the personal area network of an estimated wait time for or alternate routes for completing network access requests. For instance, the mobile devices may include a self-healing quality when one or more mobile devices locates viable alternate routes. The mobile device that have located the alternate routes may attempt to proxy the viable routes to each mobile device in a personal area network. Moreover, when the mobile devices generate a network access request that is associated a purchase request and the wireless access network is congested or is unavailable, the mobile devices may determine that a transaction processing portion of the network access can be performed over the wireless access network, but the content delivery may be completed over the personal area network. For instance, when one or more mobile devices in the personal area network own digital content that is associated with purchase request, the mobile device that initiated the purchase request may complete transaction processing details, such as payment and billing over the wireless access network, but content delivery is completed over the personal area network. Thus, embodiments of the present invention utilized wireless access conditions and personal area network to efficiently balance wireless access load.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations are contemplated within the scope of the claims. Not all steps listed in the various figures need be carried out in the specific order described.

The invention claimed is:

1. One or more tangible non-transitory computer-readable media having computer-useable instructions embodied thereon for performing a method of adapting wireless access, the method comprising:
generating network access requests for one or more mobile devices having a first interface to be used in connection with a first wireless access network and a second interface to be used in connection with a personal area network;
receiving one or more wireless access conditions from the one or more mobiles devices in a collection of mobile devices connected to the personal area network, wherein the one or more wireless access conditions include delay information for accessing the first wireless access network;
storing the one or more wireless access conditions received from each mobile device connected to the personal area network, wherein the each mobile device is a phone that is configured to share delay information for accessing the personal area network;
assigning a weight to the one or more wireless access conditions based on a number of mobile devices in the personal area network that delivered similar wireless access conditions and at least one of a type or magnitude of the wireless access conditions;
and selecting an access route based on the wireless access conditions.

2. The media of claim 1, further comprising:
generating a wireless access message that provides an indication of whether the network access request can be completed over the first wireless access network, and
selecting mobile devices in the collection of mobile devices to operate as a proxy for the remaining mobile devices.

3. The media of claim 2, wherein generating the wireless access message further comprises training the one or more wireless devices to generate a wireless access message based on the one or more wireless access conditions.

4. The media of claim 1, wherein storing the one or more access conditions further comprises assigning a predefined weight to the one or more wireless access conditions.

5. The media of claim 2, further comprising transmitting the wireless access message to the one or more mobile devices in the collection of mobile devices.

6. The media of claim 5, wherein the wireless access message provides at least one of the following: an indication of alternate access routes or an indication that one or more wireless devices should wait to access the first wireless access network.

7. The media of claim 1, wherein the collection of mobile devices are within a predefined distance and form the personal area network.

8. The media of claim 1, wherein the wireless access conditions are associated with the first wireless access network and are generated by a base station in response to the network access requests.

9. The media of claim 1, wherein the network access requests include at least one of a registration request, a purchase request, a voice communication, a video communication, or a data communication.

10. One or more mobile devices having a first interface for a first wireless network and a second interface for a personal area network and storing computer-executable instructions for performing a method of adaptive wireless access, the method comprising:
receiving wireless access conditions from at least one of a base station or one or more mobile devices in a collection of mobile devices within a predefined distance, wherein the mobile devices form a personal area network;
storing the wireless access conditions in a database on the one or more mobile devices;

assigning a weight to the wireless access conditions based on a number of mobile devices in the personal area network that delivered similar wireless access conditions and at least one of a type or magnitude of the wireless access conditions;

generating a wireless access message that provides alternate access routes based on the wireless access conditions;

updating the wireless access message based on new wireless access conditions and previous wireless access messages;

generating a wireless access message that provides an indication of whether a network access request can be completed over the first wireless access network; and selecting at least one mobile device in the collection of mobile devices to operate as a proxy for the remaining mobile devices based on the wireless access message.

11. The method of claim 10, further comprising transmitting the wireless access message to one or more mobile devices in the personal area network.

12. The method of claim 10, further comprising selecting an alternate access route based on the wireless access message.

13. The method of claim 10, wherein based on a type associated with a network access request generated by the one or more mobile devices, the wireless access message indicates that the personal area network is an alternate access route.

14. The method of claim 10, wherein the type of the network access request is a limited bandwidth request.

15. A wireless communication system having one or more mobile devices that adaptively accesses a wireless access network, the system comprising:

a database to store wireless access conditions associated with the wireless access network received from the one or more mobile devices, wherein the one or more mobile devices are phones that share delay information for the wireless access network and each phone includes interfaces for a personal area network and the wireless access network;

and an adaptive access engine to assign a weight to the wireless access conditions based on a number of mobile devices in the personal area network that delivered similar wireless access conditions and at least one of a type or magnitude of the wireless access conditions and to generate wireless access messages that provide, to the one or more mobile devices, an indication of alternate routes based on at least one of the weighted wireless access conditions and previous wireless access messages, and the adaptive access engine selects at least one of the alternate routes included in the indication for the one or more mobile devices.

16. The wireless communication system of claim 15, wherein the wireless access network is at least one of a radio frequency network or cellular network.

17. The wireless communication system of claim 15, wherein the mobile devices transmit wireless access condition over the personal area network.

18. The wireless communication system of claim 15, wherein the database stores a weight assigned to each wireless condition.

19. The wireless communication system of claim 15, wherein the base station transmits the wireless access conditions to at least one of the adaptive engine or the one or more mobile devices connected to the wireless access network.

20. The wireless communication system of claim 19, wherein the adaptive engine updates the wireless access messages based on at least new wireless access conditions and previous wireless access messages.

* * * * *